L. SESSLER.
SEED FEEDING APPARATUS FOR CULTIVATORS WITH DISKS AND ELASTIC TEETH.
APPLICATION FILED JAN. 14, 1914.
1,167,662.     Patented Jan. 11, 1916.
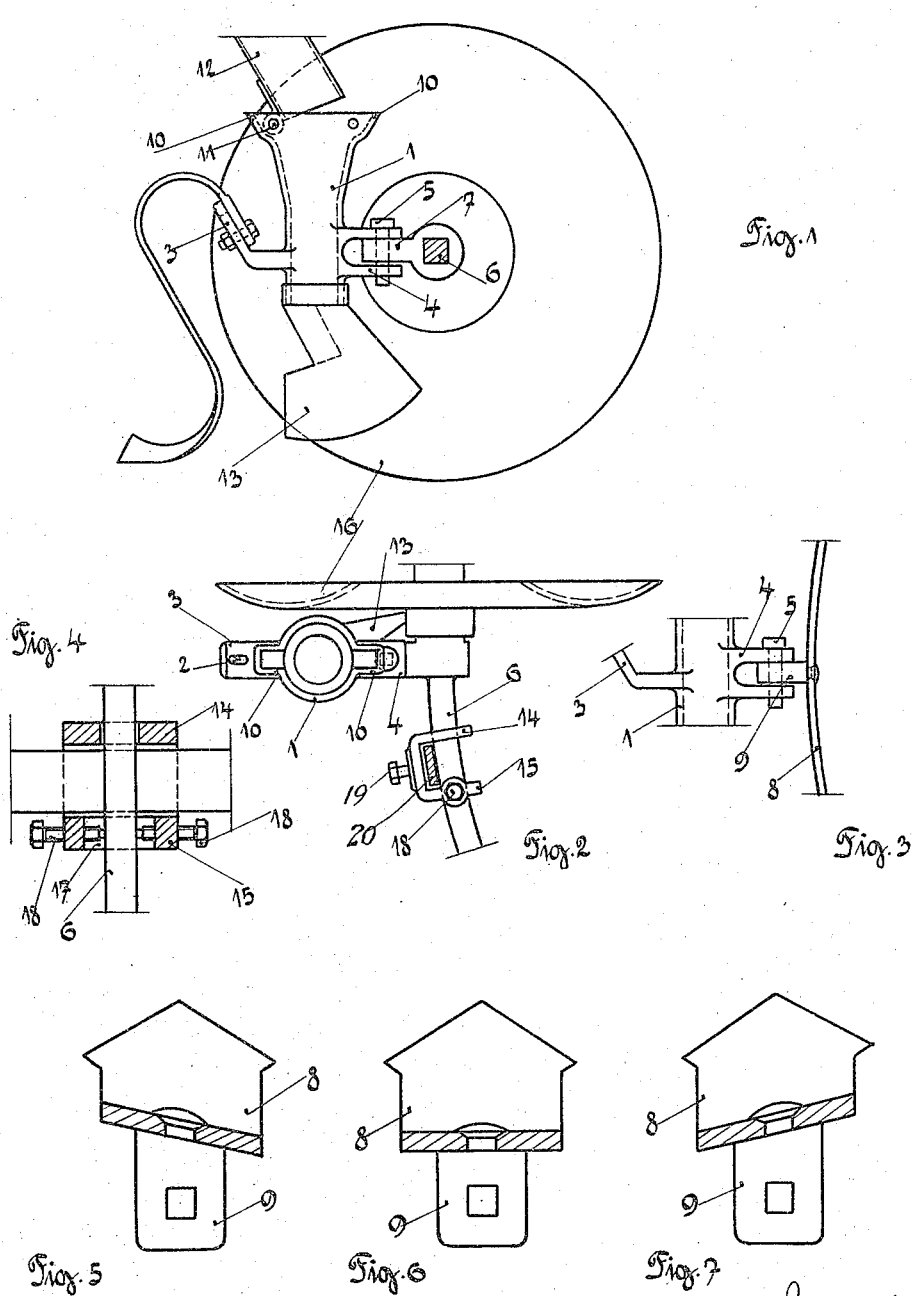

UNITED STATES PATENT OFFICE.

LEONHARDT SESSLER, OF BOTTENWEILER, NEAR ZUMHAUS, GERMANY.

SEED-FEEDING APPARATUS FOR CULTIVATORS WITH DISKS AND ELASTIC TEETH.

1,167,662.　　　　　Specification of Letters Patent.　　Patented Jan. 11, 1916.

Application filed January 14, 1914. Serial No. 812,061.

*To all whom it may concern:*

Be it known that I, LEONHARDT SESSLER, a subject of the German Emperor, and a resident of Bottenweiler, near Zumhaus, Bavaria, Germany, have invented an Improved and Novel Seed-Feeding Apparatus for Cultivators with Disks and Elastic Teeth, of which the following is a specification.

The detachable seed feeding funnels as hitherto employed in connection with drill barrows required a special construction of the former to allow their attachment to elastic teeth, as well as to the axles of the rotary disks; furthermore, special girders had to be provided which rendered the construction complicated and entailed also other drawbacks.

The deficiencies in question are obviated by making the configuration of the hoppers uniform and connecting them with their girders or carriers in a uniform manner, and the covering blades are arranged in such a manner that they may be independently adjusted in height. It is known from practical experience that it is sometimes advantageous to make the position of the disks dependent upon the profile and the condition of the soil, especially, to let the upper parts of said disks hang over rearwardly, and for this reason I have chosen as example in the drawing a form of construction in which the vertical cutting angle of the disks, together with the hoppers and the guard plates, may be regulated in a particularly simple and practical manner.

According to the present invention each funnel is provided at its rear side with an upwardly extending carrier for the covering blade, which in its turn is provided with a longitudinal slot; and at its front side the funnel has a fork with a slot into which passes a connecting link which is fastened to the corresponding elastic tooth or to the corresponding disk axle, so that the connection of any of the funnels with the corresponding tooth or disk may be effected by merely sliding the fork upon the stationary connecting link and putting a square pin provided for this purpose through the coinciding holes in the branches of the fork, whereas the adjustment in height of the covering blade is effected within the longitudinal slot with aid of the corresponding fastening screw.

To allow of attaching the funnels in the most simple manner attainable, and in consideration of the, perhaps insufficient skill of the operator, the funnels are provided with spouts at both sides, whereby the feed tubes extending from the front, as well as from the rear, may be attached in a very convenient way.

In order to make my invention more clear, I refer to the accompanying drawings, in which—

Figure 1 is a side view of the novel arrangement in question; Fig. 2 is a plan of the parts shown in Fig. 1; Fig. 3 shows the arrangement of the connecting link to an elastic tooth; Fig. 4 is a representation of the bow for adjusting the disk axle; and Figs. 5, 6, and 7 are representations of the differently shaped or distorted elastic teeth with the fork middle pieces applied to them.

The seed feeding funnel 1, which is preferably cast is provided at its rear part with an upwardly extending carrier 3 for the covering blade, this carrier has a longitudinal slot 2; at its front side the funnel has a fork 4 which is provided with square holes for reception of the fastening pin 5. The fork 4 incloses either the connecting link 7 secured to the disk axle 6 or the connecting link 9 secured to the elastic tooth 8, so that the connection of any of the funnels 1 with the connecting lugs 7 or 9 may be effected in the same manner.

The top of the funnel 1 (Fig. 1) is provided at the front and the rear ends of the same with spouts 10 which have holes 11 into which are introduced by known means and in a known manner a seed guide pipe 12 which extends to the funnel from the front or the rear ends of the apparatus.

To the lower end of the funnel is attached the known dash plate 13 for the escaping seed, whereby the possibility is offered of conducting the seed into the furrows produced by the disk or by the elastic tooth.

In order to vary the cutting angle of the disk 16 and thus to enable the adjustment of the disk axle, if this shall be necessary, in a slanting position said axle is guided in a bow 14 provided with slots and set screws (Fig. 4). The leg 15 of the bow 14 has a slot 17, within which the axle 6 can slide up or down and can be adjusted by means of set screws 18, so that the vertical position of the disks, as well as of the funnel 1 and the dash plates, may be regulated while a clamping screw 19 is adapted to secure the parts in their adjusted position. The clamping screw 19 works against the supporting standard 20.

Having now described my invention, what I desire to secure by Letters Patent of the United States is:

1. In a machine of the class described, in combination, a seed feeding funnel, an upwardly directed carrier at the rear of said funnel, a covering blade secured to said carrier, a fork at the front side of said funnel, rotating means for drilling the soil, a link secured to the axle of said soil drilling means and means for connecting said fork with said link of the said soil drilling means, substantially as described.

2. In a machine of the class described, in combination, a seed feeding funnel, an upwardly directed carrier at the rear of said funnel, a covering blade secured to said carrier, a fork at the front side of said funnel, a drilling disk for loosening and turning the soil, a link secured to the axle of said drilling disk, means for connecting said link and said fork, and means for adjusting the covering blade in said carrier, substantially as described.

In testimony whereof I affix my signature in presence of two witnesses.

LEONHARDT SESSLER.

Witnesses:
 OSCAR BOCK,
 G. IBBUER.

Copies of this patent may be obtained for five cents each, by addressing the "Commissioner of Patents, Washington, D. C."